Jan. 3, 1956

B. DE GOEDE 2,729,563

PROCESS FOR THE PREPARATION OF BUTTER
FROM HIGH CONCENTRATED CREAM

Filed Aug. 1, 1951

Inventor:
Barend de Goede

By:

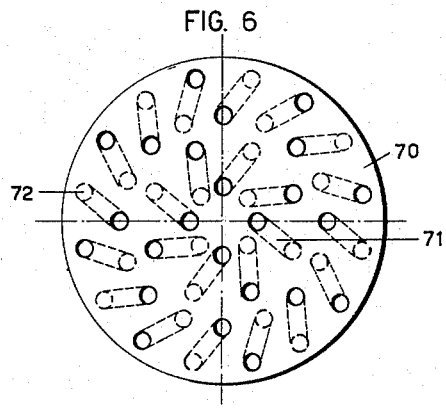
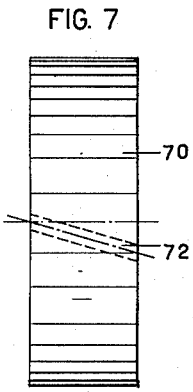
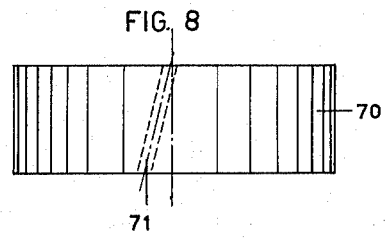
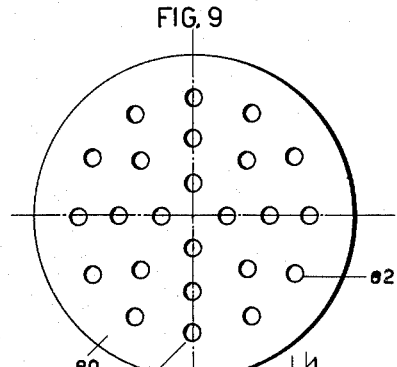
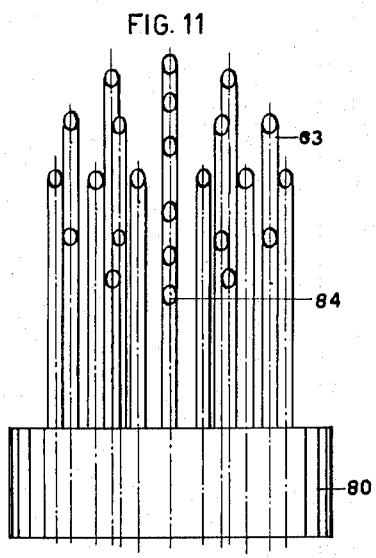
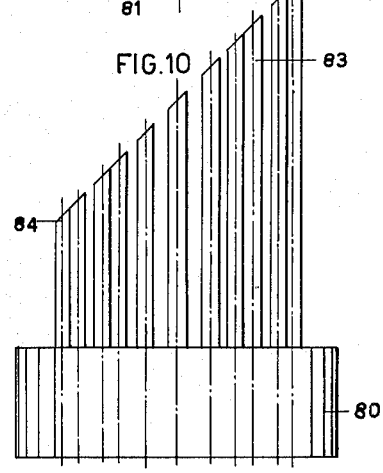

2,729,563

PROCESS FOR THE PREPARATION OF BUTTER FROM HIGH CONCENTRATED CREAM

Barend de Goede, The Hague, Netherlands, assignor to De Nederlandse Centrale Organisatie Voor Toegepast-Natuurwetenschappelijk Onderzoek, The Hague, Netherlands, a corporation of Netherlands Application August 1, 1951, Serial No. 239,700

Claims priority, application Netherlands August 5, 1950

6 Claims. (Cl. 99—119)

Various suggestions have been made for the production of butter from milk without the need for a churning process.

Some of these suggestions have led to methods presently in practice. The Alfa-Laval process is the best known of these. This process consists in the preparation of cream, with a fat- and a water-content which must be equal to that of the butter to be made, by centrifuging preheated milk in one or two steps. Thereafter this cream is transformed, by means of cooling to a temperature between 8° and 13° C. into a product in which the continuous phase consists of butterfat and in which there is no more water.

However, the thus prepared butter shows various disadvantages compared with normal churning butter. The principal disadvantage is the oiling off at higher temperature, which in the so-called Alfa-butter already occurs to a troublesome degree at temperatures of more than 20° C. This can be improved somewhat by repeatedly kneading the obtained butter, but the product obtained in this way has an insufficient body and greasy consistency; even without kneading, the consistency of Alfa-butter is already rather soft.

The invention relates to a process of making butter from concentrated cream.

The principal object of the invention is to provide a process for continuous butter production from concentrated cream, this butter having sufficient firmness and low oiling off at higher temperature.

It is a further object of the invention to describe a form of apparatus that has been efficient in carrying out this process.

Other objects will be apparent as the description hereinafter proceeds.

The invention is based upon the observation that the obtained butter has a better quality the higher the temperature at which the plastic cream is converted into butter. In practice the temperature is, however, limited by the drawback that at temperatures above 15° C. no reversal of phase can be accomplished by a simple mechanical treatment so that usually a temperature above 13° C. is not utilized.

I have now found that phase reversal appears and can be carried out at much higher temperatures and with only a simple mechanical treatment, when butter is mixed with highly concentrated sweet or sour cream, this cream preferably having a fat content of at least 80%. The products made in this way have a considerably better quality than known products. As a rule, mixing butter and highly concentrated cream in a simple mixing apparatus is in itself sufficient to accomplish a complete conversion of the cream into butter. Depending on the circumstances, the reversion of phase proceeds in a period of time varying from fractions of a minute to some minutes.

The added butter may consist of the product manufactured in this way so that nothing else is necessary but to recycle part of the produced product to the cream in order to make possible a simple continuous process that also can be carried out at temperatures of 17°–33° C. The degree of treatment necessary to achieve the reversion of phase depends on the treating temperature, on the fat content of the cream, and on the percentage of final product that is recycled to the cream. By raising the temperature, or reducing the fat content or the recycled percentage a more intensive treatment is necessary.

In order to obtain a normal butter, the temperature should be below about 33° C.

A very satisfactory result is attained by mixing a percentage of 20–30% of the final product (the produced butter) with the cream at a temperature of 21°–27° C. The thus obtained butter has excellent properties; the oiling off is less and the firmness greater than that of butter manufactured in the well-known way.

The taste of butter prepared from sweet cream deviates somewhat from butter prepared in the well-known way from sour cream; but sometimes this classic taste is desired. It is difficult to concentrate sour cream to plastic cream by centrifuging. Therefore it is preferred, when butter from sour cream is desired, that sweet cream as such is concentrated to a sufficient fat content and that this cream is subsequently soured. According to the invention the concentrated cream is therefore preferably kept at a higher temperature (e. g. of 30° C.) for some hours, after inoculation with sour cream, if butter is desired which will have the taste of churned butter.

The obtained butter may be submitted to any desired treatment necessary to obtain a product coming up to distinct requirements; the taste is good and a fine distribution of moisture is attained, and in general undistributed moisture is not found.

The mixing process may be carried out with any mixing apparatus suitable for mixing the plastic cream with the butter. It can be a discontinuously, as well as a continuously working apparatus. In general, a thorough mixing is advantageous.

In the accompanying drawings, Fig. 1 diagrammatically illustrates a simple form of a continuously working apparatus for carrying out the process according to my invention.

Fig. 2 gives another diagrammatic representation of a typical apparatus for practicing the invention.

Fig. 6 is a side view, and Figs. 7 and 8 are sectional views of another form of such detail.

Fig. 9 is a front view, Fig. 11 a vertical view, and Fig. 10 a side view of the device by which the recycled butter is added to the cream.

Figure 1:
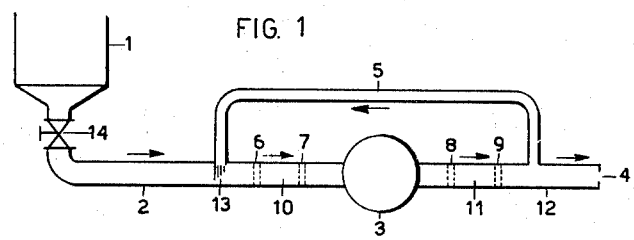

In Fig. 1, the vat or container containing the plastic cream is indicated by 1. From this vat the cream is sucked through valve 14 into conduit 2 by pump 3. By the device 13, given in detail in Figs. 9, 10 and 11, butter is added to the cream, the butter and the cream are mixed by the mixing devices 6, 7, described in detail later on, in conduit 10 and further mixed in the pump 3 and the mixing devices 8, 9, similar to 6, 7, in conduit 11. After passing through mixing device 9, the whole mass has been converted into butter. The thus formed butter is partly pressed out of the apparatus through conduit 12 and adjustable nozzle 4. Another part, the quantity of which depends on the aperture of nozzle 4, flows back to the addition device of the butter 13 through conduit 5.

Figure 2:
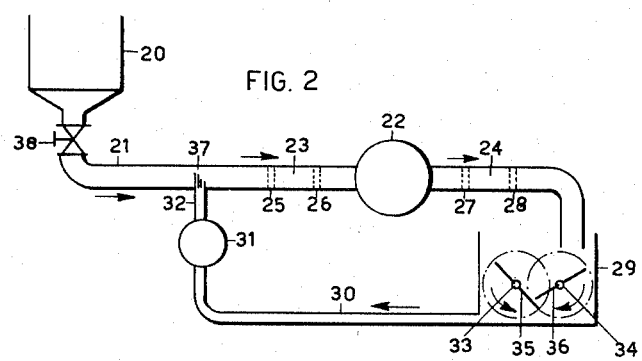

In Fig. 2 the vat containing the plastic cream is indicated by 20; through valve 38 and conduit 21 the cream is sucked by pump 22. By addition device 37 butter, recycled from vat 29 through conduit 30 by pump 31 and conduit 32, is added to the cream. Cream and butter are mixed by mixing devices 25, 26 in conduit 23, and by pump 22 and mixing devices 27, 28 in conduit 24. The butter obtained flows from the end of conduit 24 into the vat 29. This vat is provided with a mixing device consisting of two worm screws 35, 36, rotating in opposite direction around the spindles 33, 34, for a repeated kneading, that in some cases may improve the quality of the butter. From this vat a part of the butter is recycled to the cream by pump 31; the percentage of the recycled butter may be adjusted by adjusting the relative capacities of the pumps 22 and 31.

Figure 3:
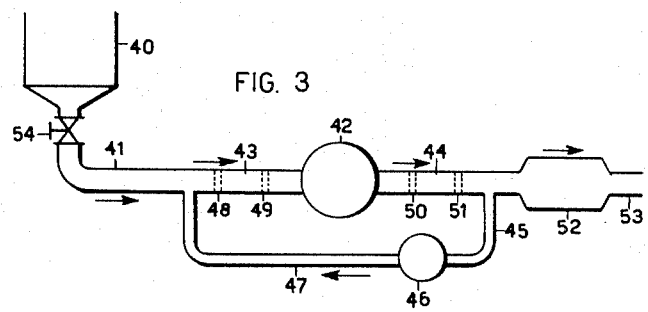
Fig. 3 is still another diagrammatic form of an apparatus according to the invention.

In Fig. 3 the vat, containing the plastic cream, is indicated by 40; through valve 54 the cream is sucked from this vat into conduit 41 by pump 42. Recycled butter flows through conduit 47 and is mixed with the cream by mixing devices 48, 49 in conduit 43, pump 42 and mixing devices 50, 51 in conduit 44. A part of the formed butter is recycled to the cream through conduits 45 and 47 by pump 46; the other part is rekneaded in a kneading device 52 and flows out of the apparatus through conduit 53.

Figure 4:
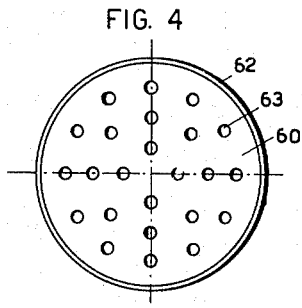
Fig. 4 is a side view, and Fig. 5 a sectional view of a detail of the mixing device.
Figure 5:
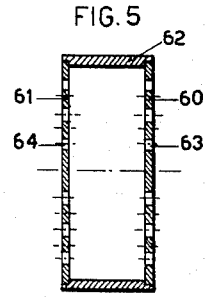

A simple form of the mixing device is indicated in Figs. 4 and 5. It consists of two circular discs 60, 61, fixed at a cylinder 62. Each disc is provided with apertures 63, 64, through which the butter and cream are sucked or pressed, and by which they are mixed.

I prefer a modified mixing device according to Figs. 6, 7 and 8, wherein 70 is a disc of a thickness of about one inch, provided with bore holes 71, 72 having a diameter of about 0.1 inch and with axes in different directions. By repeatedly pressing butter and plastic cream simultaneously through similar discs, an intimate mixing is achieved.

There is some advantage to dividing the butter in the cream by the addition device according to Figs. 9, 10 and 11. This device consists of a disc 80 with a set of apertures 81, 82, each aperture being provided with an outlet tube 84, 83, respectively the length of which varies for the different apertures, by which the butter is divided in the constant streaming flow of plastic cream.

EXAMPLE I

Reversion of phase took place in cream and the whole mass became butter as soon as a quantity of cream with a fat content of 80% and at a temperature of 25° C. was mixed in a simple mixing apparatus in intimate contact with an equal quantity of churned butter at a temperature of 25° C. The reversion of phase can be determined by all known methods with which water-in-oil and oil-in-water emulsions are distinguished.

The obtained butter had a good consistency and taste and was free of moisture.

EXAMPLE II

As in Example I, cream was mixed with churned butter in the ratio of 90% of cream and 10% of butter at a temperature of 25° C. for each of the two components.

Again the reversion of phase appeared to be obtained with contact with the butter; however, by the less favorable proportion of the components (compared with Example I), the conversion of the whole mass into butter took a longer time and a prolonged mechanical treatment was necessary. The quality of the obtained butter was very much the same as that of Example I.

EXAMPLE III

Using a ratio of 90% of cream and 10% of butter, recycling 10% of the final product into the cream with an apparatus according to Fig. 1 at a temperature of 18° C., the reversal of phase appeared to proceed quicker than in Example II, but the obtained butter was less firm.

EXAMPLE IV

A firm butter with only little oiling off was obtained when, in an apparatus according to Fig. 2, 25% of the final product was recycled at a temperature of 26° C., this temperature being maintained as well for the cream as for the butter that was recycled; while the forming of the butter proceeded with a reasonable quickness, only a little less than that, mentioned in Example I.

The working capacity of an apparatus with conduits of about 2 inches diameter and provided with 4 mixing devices according to Figs. 6, 7 and 8 is about 300 kg. of butter per hour.

EXAMPLE V

With the apparatus of Fig. 3 and mixing cream and butter through 4 mixing devices according to Figs. 6, 7 and 8, recycling 20% of the butter to the cream and working at a temperature of 28° C., re-kneading the formed butter by a screw stirrer, a butter of high quality, good firmness and very little oiling off was obtained.

The capacity of an apparatus, with conduits of about 2 inches diameter and mixing devices of the same diameter is about 250 kg. at this temperature.

EXAMPLE VI

After concentration to a fat content of 80–85%, cream was inoculated with 7% of sour cream and kept at a temperature of 30° C. It was treated further according to Example IV, and at a temperature of 22° C. a butter was obtained, having the taste of churned butter produced and a sufficient firmness. The oiling off was somewhat greater than that of butter from sweet cream.

Quality test

The butter obtained according to Examples I to VI included, as well as the used churned butter was tested to determine the firmness according to the method of "Kruisheer en de Herder" at 16° C. as described in "Chemisch Weekblad" 35 (1938), 719—36 (1939) page 292, and the oiling off after 48 hours at 28° C. was determined, the latter according to the method suggested in "Die Milchwissenschaft" of January 1948.

|  | Oiling off, percent | Firmness | Percent butter added to the cream | Working temperature, centigrade |
| --- | --- | --- | --- | --- |
| Churning butter | 13.5 | 40 | | |
| Butter of Ex. I | 7.1 | 56 | 50 | 25 |
| Butter of Ex. II | 3.2 | 60 | 10 | 25 |
| Butter of Ex. III | 2.4 | 48 | 10 | 18 |
| Butter of Ex. IV | 3.5 | 68 | 25 | 26 |
| Butter of Ex. V | 3.0 | 77 | 20 | 28 |
| Butter of Ex. VI | 6.6 | 53 | 25 | 22 |

I claim:
1. A process of preparing butter from cream, comprising the steps of adding butter to cream having a high fat content; and intimately mixing said cream and butter at a temperature of 17–33° C. until a substantially uniform mixture of said cream and butter is formed, resulting in conversion of said cream having a high fat content into butter without churning thereof.

2. A process of preparing butter from cream, comprising the steps of adding butter to cream having a fat content of at least 80%; and intimately mixing said cream and butter at a temperature of 17–33° C. until a substantially uniform mixture of said cream and butter is formed, resulting in conversion of said cream having a high fat content into butter without churning thereof.

3. A process of preparing butter from cream, comprising the steps of adding butter to cream having a fat content of at least 80%; and intimately mixing said cream and butter at a temperature of 21–28° C. until a substantially uniform mixture of said cream and butter is formed, resulting in conversion of said cream having a high fat content into butter without churning thereof.

4. A process of preparing butter from cream, comprising the steps of adding butter to cream having a fat content of at least 80%, the amount of butter being up to 50% of the total mixture; and intimately mixing said cream and butter at a temperature of 17–33° C. until a substantially uniform mixture of said cream and butter is formed, resulting in conversion of said cream having a high fat content into butter without churning thereof.

5. A process of preparing butter from cream, comprising the steps of adding butter to cream having a fat content of at least 80%, the amount of butter being between 20–30% of the total mixture; and intimately mixing said cream and butter at a temperature of 17–33° C. until a substantially uniform mixture of said cream and butter is formed, resulting in conversion of said cream having a high fat content into butter without churning thereof.

6. A continuous process of preparing butter from cream, comprising the steps of adding butter to cream having a fat content of at least 80%, the amount of butter being up to 50% of the total mixture; intimately mixing said cream and butter at a temperature of 17–33° C. until a substantially uniform mixture of said cream and butter is formed, resulting in conversion of said cream having a high fat content into butter without churning thereof; and recycling a portion of the thus formed butter to be added to additional cream and intimately admixed therewith so as to convert the additional cream to butter.

References Cited in the file of this patent

UNITED STATES PATENTS

| | | |
|---|---|---|
| 334,430 | Guinnip | Jan. 19, 1886 |
| 335,084 | Murray | Jan. 26, 1886 |
| 2,423,834 | Horneman et al. | July 15, 1947 |
| 2,569,203 | Stigen | Sept. 25, 1951 |

OTHER REFERENCES

"Buttermaking: Old and New," by A. H. White, Canadian Food Industries, September 1947, pp. 16–21.